US012694903B2

(12) United States Patent
Boscolo Berto et al.

(10) Patent No.: US 12,694,903 B2
(45) Date of Patent: Jul. 28, 2026

(54) METHOD OF OPERATING HARD DISK DRIVE, CORRESPONDING CONTROL CIRCUIT, HARD DISK DRIVE AND PROCESSING DEVICE

(71) Applicant: STMicroelectronics International N.V., Geneva (CH)

(72) Inventors: Michele Boscolo Berto, Milan (IT); Maurizio Ricci, Bergamo (IT); Marco Ferrari, Voghera (IT); Diego Tognoli, Tokyo (JP); Giuseppe Maiocchi, Villa Guardia (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 19/188,919

(22) Filed: Apr. 24, 2025

(65) Prior Publication Data

US 2025/0364012 A1 Nov. 27, 2025

(30) Foreign Application Priority Data

May 24, 2024 (IT) ........................ 102024000011848

(51) Int. Cl.
| | |
|---|---|
| *G11B 21/22* | (2006.01) |
| *G11B 5/54* | (2006.01) |
| *G11B 21/12* | (2006.01) |

(52) U.S. Cl.
CPC ................ *G11B 21/22* (2013.01); *G11B 5/54* (2013.01); *G11B 21/12* (2013.01)

(58) Field of Classification Search
None
See application file for complete search history.

(56) References Cited

U.S. PATENT DOCUMENTS

| | | | |
|---|---|---|---|
| 12,334,119 B2 | 6/2025 | Boscolo Berto | |
| 2006/0066981 A1* | 3/2006 | Brenden ................... | G11B 5/54 |
| 2007/0279793 A1 | 12/2007 | Hansen et al. | |
| 2007/0285827 A1* | 12/2007 | Yamashita ............. | G11B 21/12 |
| 2009/0034113 A1* | 2/2009 | Hashi ..................... | G11B 5/486 360/75 |
| 2010/0061022 A1* | 3/2010 | Ayala, II .............. | G11B 5/4806 |
| 2023/0267963 A1* | 8/2023 | Ferrari ................. | G11B 21/083 360/78.04 |
| 2023/0318493 A1* | 10/2023 | Galbiati .................... | H02P 3/18 318/362 |
| 2025/0364012 A1* | 11/2025 | Boscolo ................. | G11B 21/22 |

FOREIGN PATENT DOCUMENTS

EP 1118994 A2 7/2001

* cited by examiner

*Primary Examiner* — Peter Vincent Agustin
(74) *Attorney, Agent, or Firm* — Slater Matsil, LLP

(57) ABSTRACT

The disclosure relates to a voice coil motor (VCM) in a hard disk drive during a retract phase, wherein read-and-write heads of the hard disk drive are retracted by the VCM from a disk surface towards an end-of-travel parking condition with the heads climbing over a ramp starting from a ramp edge adjacent the disk surface. During the retract phase, the VCM is operated in a discontinuous mode comprising an alternation of on-times of duration TON and off-times of duration TOFF wherein supply of a drive current to the VCM is facilitated and countered, respectively. The duration TOFF of the off-times is varied to have a lower bound value at the ramp edge and to increase towards an upper bound value as the heads climb over the ramp towards the end-of-travel parking condition.

20 Claims, 6 Drawing Sheets

FIG. 3A

VCM Peak

VCM Diff

~50mV

~500mV

0

N

METHOD OF OPERATING HARD DISK DRIVE, CORRESPONDING CONTROL CIRCUIT, HARD DISK DRIVE AND PROCESSING DEVICE

CROSS-REFERENCE TO RELATED APPLICATIONS

This application claims the benefit of Italian Patent Application No. 102024000011848, filed on May 24, 2024, which application is hereby incorporated herein by reference.

TECHNICAL FIELD

The description relates to hard disk drives (HDDs) and methods.

Solutions as described herein can be applied, for instance, in hard disk drives used in processing devices such as computers, servers, data centers and the like.

BACKGROUND

Hard disk drive (HDD) devices include voice-coil motors (VCM motors or, briefly VCMs) that are used for positioning read-and-write heads.

When an HDD is in an operational mode, a VCM motor is used for positioning the read-and-write heads over the surface of the hard disk where data is stored. When the HDD is not in an operational mode, the read-and-write heads are positioned (parked) in a safe and protected area via a retract (or park/parking) procedure.

The speed of the heads (and thus of the VCM) during parking (retract) phases can be controlled in a discontinuous driving mode with on-times (of duration TON) where the motor is energized alternated with off-times (of duration TOFF) where the motor is not energized.

During an on-phase, a current is caused to flow in the motor winding(s) and generates a motor torque; during an off-phase the current is interrupted and, if the speed is not null, a back electro-motive force (BEMF) voltage is generated across the motor winding(s). The BEMF voltage is (directly) proportional to the VCM motor speed and can therefore be used as a feedback signal in a speed control loop.

In modern HDDs, a head parking area is provided located on the outermost part of the disk (currently referred to as outer diameter (OD)) where a ramp facilitates parking the heads safely.

In a retract phase, the heads should desirably transit from the surface of the disk to the park position at the end of the ramp at a controlled (low) speed.

The travel path to the park position includes critical points where the speed control may not have a bandwidth (BW) wide enough to facilitate compliance with speed specifications in terms of minimum/maximum speed.

For instance, in conventional discontinuous retract techniques involving a constant off-time of duration TOFF, the bandwidth cannot be extended to high frequencies in so far as a minimum duration of the off-time (and an on-time associated therewith to achieve a duty-cycle value as set) long enough to facilitate an accurate measurement of the BEMF is desired.

The voltage measured across the VCM motor when the current is interrupted during an off-time in a discontinuous driving mode is affected by a residual voltage generated by the abrupt interruption of the current. This residual voltage negatively affects the BEMF measure (speed measure) and then the HDD performance during the retract, and is a function of the current amplitude during the on-phase preceding the point of time where the VCM speed is measured based on the BEMF.

A value of the duration of the off-time TOFF can thus be selected (to be maintained as a fixed value during the entire retract procedure) considering a worst-case situation, namely the maximum current condition, which usually coincides with the end-of-travel point (EOT).

Selecting for the duration TOFF a value that is too short militates against a correct control action of the VCM, for instance in detecting the EOT condition.

Various undesired consequences may thus ensue: for instance, acoustic noise can be generated is response to the VCM reaching the EOT point due to EOT misdetection related to discontinuous driving being maintained over an excessive time and/or the VCM speed may be estimated incorrectly in those areas where the current has a relatively high amplitude.

SUMMARY

An object of solutions described herein is to contribute in addressing the issues discussed in the foregoing.

According to one of more embodiments, that object is achieved with a method as set forth in the claims that follow.

Solutions as described herein relate to a corresponding controller circuit for hard disk drives.

Solutions as described herein relate to a corresponding hard disk drive.

Solutions as described herein relate to a corresponding processing device equipped with one or more hard disk drives. A computer, a server, or a data center are exemplary of such a device.

The claims are an integral part of the technical teaching on the embodiments as provided herein.

In solutions as described herein, a discontinuous-mode retract approach is adopted with a variable operating frequency that can be modulated as a function of the driving current.

This facilitates increasing the bandwidth of the speed control loop: in fact, it is observed that, during a retract phase of the read-and-write heads of an HDD, a critical point occurs at the initial portion of the ramp provided for parking the heads, where a relatively low driving current is used.

Speed control in that portion can be improved by increasing the operating frequency and therefore the obtained bandwidth (BW) of the speed control loop.

Another critical aspect of a retract phase is found to lie in adequately detecting the end-of-travel point (EOT).

In the EOT zone, currents are relatively high and an accurate measurement of the BEMF would involve a relatively long duration TOFF of the off-times. In that area, a limited bandwidth BW of the speed control loop is not particularly critical and a reduction in the operating frequency during discontinuous driving (and consequently a reduction in the BW of the speed loop) can be tolerated.

Solutions as described herein facilitate reducing speed variations during ramp climbing and correctly detecting the end-of-travel (EOT) point via a modulation of the duration of the off-time TOFF (and thus of the operating frequency during discontinuous driving) that can be a function of the driving current amplitude.

BRIEF DESCRIPTION OF THE DRAWINGS

Solutions described herein will now be described, by way of example only, with reference to the annexed figures, wherein:

FIG. 3A is exemplary of a possible trend of VCM peak current values used during a test to measure the residual voltage;

FIG. 3B is exemplary of a possible trend of VCM differential voltage used during a test to measure the residual voltage;

Corresponding numerals and symbols in the different figures generally refer to corresponding parts unless otherwise indicated.

Figure 1:
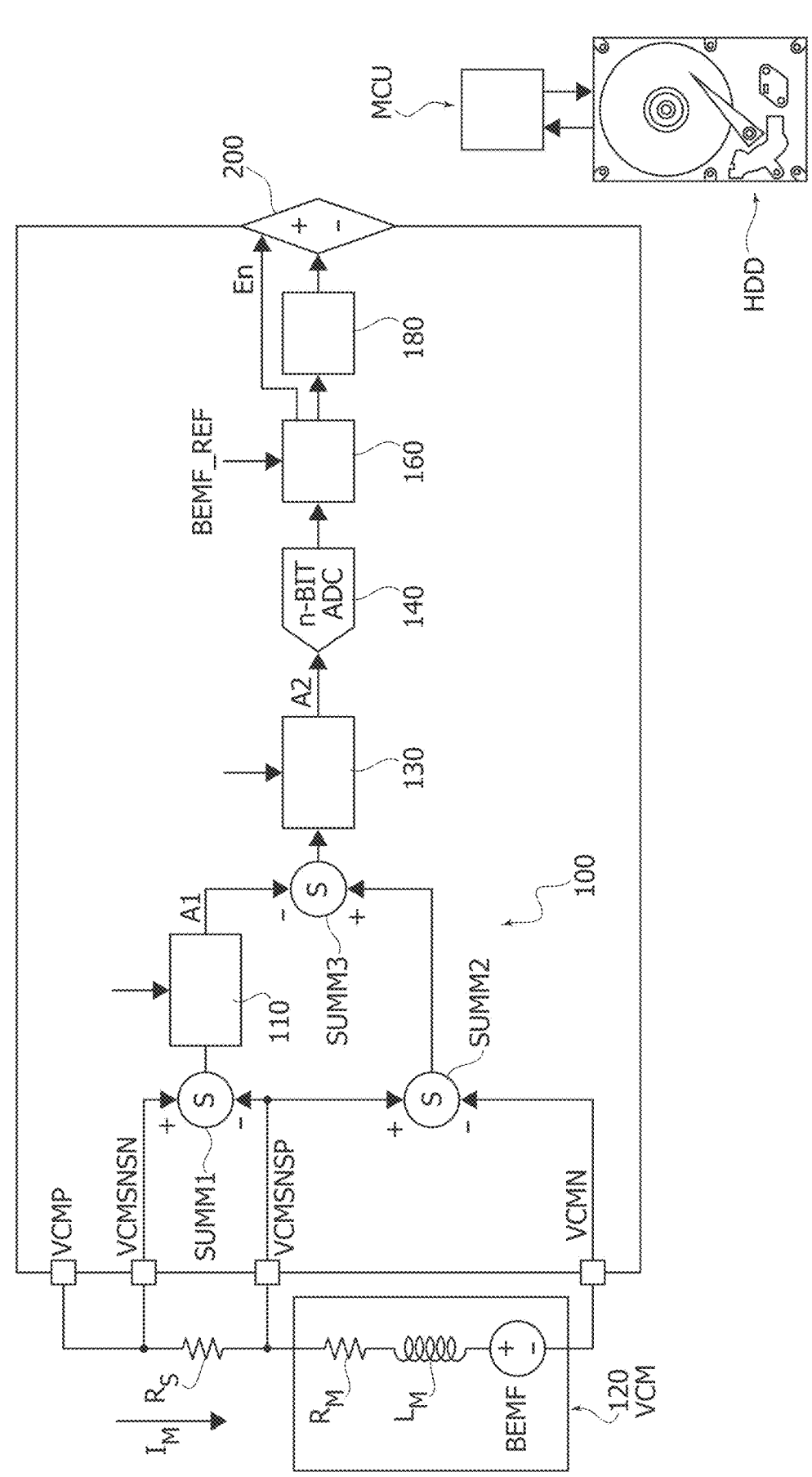
FIG. 1 is a block diagram of a hard disk drive (HDD) equipped with a BEMF reconstruction circuit ("BEMF monitor") used for the reconstruction of the BEMF during VCM driving.

The figures are drawn to clearly illustrate the relevant aspects of the embodiments and are not necessarily drawn to scale.

The edges of features drawn in the figures do not necessarily indicate the termination or the extent of the feature.

Also, for the sake of simplicity and ease of explanation, a same designation may be applied throughout this description to designate a circuit node or line as well as a signal occurring at that node or line.

The quantitative values indicated in (or derivable from) any of the figures annexed herewith are merely exemplary and non-limiting.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

Unless specified otherwise, the term "about" is used herein to mean with a tolerance of plus or minus 10%, and preferably of plus or minus 5%, of the value in question.

Once more, for the sake of simplicity and ease of explanation, a same designation may be applied throughout this description to designate:

a certain node or line as well as a signal occurring at that node or line, and/or a certain component (such as a capacitor, resistor or inductor of coil) as well as electrical parameters thereof.

As discussed in the introductory portion of this description, HDD is a shortened designation for hard disk drive.

A hard disk drive is a component of various types of processing devices such as personal computers, servers, data centers or the like and is the physical location where information is stored.

Hard disk drives (HDDs) employ a spindle motor to rotate one or more disks as well as one or more voice coil motors or VCMs to move the read-and-write heads with respect to the disk(s). That is, the spindle motor is used to spin the hard disk(s) on which data are stored and the VCM motor or motors is/are used to position the read-and-write heads on the surface of hard disk(s).

Hard disk drives thus include at least two motors (spindle and VCM) that are driven by power semiconductor devices (integrated circuits) usually referred to as power combos.

In current HDDs a ramp is provided at the outer side of the disk (outer diameter, OD); that ramp is used to position the read-and-write heads when they are not in use (that is, when the heads are in the parked position).

The procedure implemented to move the heads from a parked position to an operating position on the disk surface is referred to as "VCM load"; the reverse procedure, that is, moving the heads from the disk surface to a parked position is referred to as "VCM unload", "VCM retract" or "VCM parking".

Performing the load and unload procedures at controlled speed facilitates avoiding damage to the heads or to the surface of the disk (disk scratch).

As represented in FIG. 1, in HDD applications, a servo controller MCU can be provided to adjust the VCM drive current as desired, for instance to keep the heads on track and/or to facilitate adequately performing "VCM load" and "VCM unload"/"VCM retract" procedures. This may occur via a (speed) control word provided by the controller MCU.

A feedback signal can be used to control the speed of the VCM.

The voltage (Back ElectroMotive Force or BEMF) generated by the VCM motor during movement can be used for that purpose in so far as the BEMF is (directly) proportional to the speed of the VCM.

This general principle underlying operation of a VCM in an HDD is conventional in the art and a more detailed description is not provided herein for brevity.

Also, it will be appreciated that the present description is primarily concerned with adequately driving a VCM motor in a discontinuous mode while also facilitating accurate measurement of the BEMF.

As noted, in hard disk drive (HDD) applications there are at least two motors (spindle and VCM) that are driven by power devices (integrated circuits): these devices are currently referred to as power combos.

The spindle motor is used to rotate the hard disks on which data is stored and the VCM motor is used to position the read-and-write heads on the surface of the hard disks.

On the external part of the disk (outer diameter, OD) of present-day HDDs there is a ramp which is used to position the heads, when not in use, to a "parking" position.

The procedure performed to move the heads from the park position to the operational position on the disk surface is currently referred to as "VCM load" while the complementary procedure, namely moving the heads from the disk surface to the parking position, is currently referred to as "VCM unload", "VCM retract" or "VCM park(ing)".

In order to avoid undesired damage to the heads or the disk surface (disk scratch) the load and unload procedures are carried out at a controlled (low) speed.

A speed control loop can be used to control the VCM speed based on a feedback signal. Advantageously, a voltage signal generated by the VCM motor during movement (the back electromotive force or BEMF) is used as this is directly proportional to the speed of the VCM.

FIG. 1 is a block diagram of a circuit 100 that can be used for Back ElectroMotive Force, BEMF reconstruction during driving of a Voice Coil Motor, VCM, designated with reference 120 and represented as a (voltage) source of Back ElectroMotive Force, BEMF with an associated (series) inductance LM and resistance RM.

A BEMF reconstruction circuit 100 as illustrated in FIG. 1 can be used when load/unload procedure are performed in continuous mode where there is not a current interruption that allow reading the BEMF directly across the VCM terminals.

A BEMF reconstruction circuit 100 as illustrated in FIG. 1 comprises input nodes VCMSNSP and VCMN coupled across a VCM 120, plus at least one further input node VCMSNSN with a resistor $R_S$ coupled between the nodes VCMSNSN and VCMSNSP. The voltage across the resistor $R_S$ (the voltage drop between the nodes VCMSNSN and VCMSNSP) is a measure of a current $I_M$ that flows towards the VCM 120 starting from a supply node VCMP.

A first summation node SUMM1 (with sign) produces a signal based on the difference between the voltages at the nodes VCMSNSN and VCMSNSP, which is thus a measure of the current $I_M$ and is amplified via a first gain stage 110 to produce a signal A1.

A second summation node SUMM2 (with sign) produces a signal based on the difference between the voltages at the nodes VCMSNSP and VCMN, which is thus a measure of the voltage drop across the VCM 120.

A third summation node SUMM3 (with sign) produces a signal based on the difference between the voltage at the output of the second summation node SUMM2 and the voltage A1. The difference signal thus obtained is amplified via a second gain stage 130 to produce a signal A2 that can be converted to digital via an analog-to-digital converter 140.

When load/unload procedure are performed in discontinuous mode some blocks of circuit 100 do not come into play because the current is null. During an off-time of discontinuous driving the signal A1 is zero (in so far as $R_S*I_M=0$) and the signal A2 is then equal to the BEMF (possibly scaled by a "pure" A2 gain factor introduced by block 130). In a discontinuous mode the output of circuit 100 is then the "pure" BEMF.

In fact, an advantage of such a discontinuous driving mode lies in the absence of calibrations to reconstruct the BEMF (the gain of block 110 is a no-care); conversely, a disadvantage lies in a lower bandwidth (BW) of speed control compared to continuous driving methods. Speed control BW is limited by the discontinuous driving frequency.

The circuitry represented and indicated there as a whole by reference numeral 100 in FIG. 1 has associated therewith—according to solutions that will be described in the following—two further blocks 160 and 180 (a retract logic block and a digital-to-analog converter, DAC) that provide a signal to be applied to a (power) voltage amplifier 200 used to supply a voltage between the nodes VCMP and VCMN to control operation of the VCM in a discontinuous mode during a retract phase. The block 180 (DAC) controls the power stage: the DAC input value (coming from the retract logic block 160) is a parameter that defines the voltage applied to the VCM coil end then, as a consequence, defines the current flowing into the VCM coil. The DAC input value is used herein to estimate the VCM current as described below in more detail.

It is otherwise noted (this also applies to the description provided in connection with the further figures) that the VCM 120 per se may not be a part of the circuitry for BEMF reconstruction/VCM control as supplied. That circuitry and the VCM can be connected only by the end user.

Two approaches can be adopted in measuring the BEMF of a VCM:

a first approach involves reconstructing (typically in an analog form) the BEMF voltage based on the characteristics of the VCM motor: see, for instance, the resistance $R_M$ and the current sensing circuit, that is, the resistance $R_S$ as shown in FIG. 1;

a second approach involves a direct measurement of the BEMF across the motor terminals carried out after current circulation is interrupted for a short time.

The circuit 100 can be used in both approaches with the proviso that:

when continuous mode is used, adequate operation almost invariably requires an accurate calibration, when discontinuous mode is used, such an accurate calibration is no longer required.

The first approach can be resorted while the VCM is driven continuously: the current in the VCM motor is not or never interrupted but delivered continuously.

The second approach can be resorted with the VCM driven discontinuously: the current in the motor is interrupted for a certain off-time (of duration TOFF) at regular intervals to facilitate reading the BEMF voltage (which is proportional to the speed) directly at the terminals of the VCM motor.

Controlling the VCM speed in a continuous mode is usually preferred over a discontinuous control. However, continuous control may not be always feasible in so far as it involves an accurate and relatively complex calibration of the BEMF reconstruction circuit that can be adequately performed only if certain conditions are met.

The circuitry indicated as a whole by reference numeral 100 in FIG. 1 (again, leaving out the blocks 160 and 180 discussed in the following) is exemplary of a "BEMF monitor" that can be used for BEMF reconstruction during continuous driving but requires calibration in so far as the results provided thereby are affected by the motor resistance $R_M$ (for instance, it is observed that the gain A1 of the first gain stage 110 is determined by the ratio $R_M/R_S$) and the resistance $R_M$ is not constant but varies with variations of the temperature.

Due to this temperature dependence, circuitry indicated as a whole by reference numeral 100 in FIG. 1 can be adequately used as a "BEMF monitor" if calibrated at a time immediately preceding its use.

This may be feasible for load and unload phases in normal operating conditions of an HDD, but may turn out to be hardly possible in those cases where the heads are intended to be parked in response to a critical emergency event (for example: loss of the power source).

In this latter case, parking of the heads may amount to an emergency retract phase which should desirably be carried out immediately and without any latency as possibly introduced by a calibration phase.

Moreover, in emergency conditions the MCU is usually not active and thus unable to support calibration and/or emergency retract using firmware (FW) routines. In emergency situations the whole emergency retract is expected to be carried out using hardware (HW) procedures embedded into the "power combo" device.

In the case of such an emergency retract, discontinuous-mode driving can be used as this facilitates measuring the BEMF of the VCM motor directly across the terminals of the VCM motor, without any calibration involved.

Figures 2A, 2B:
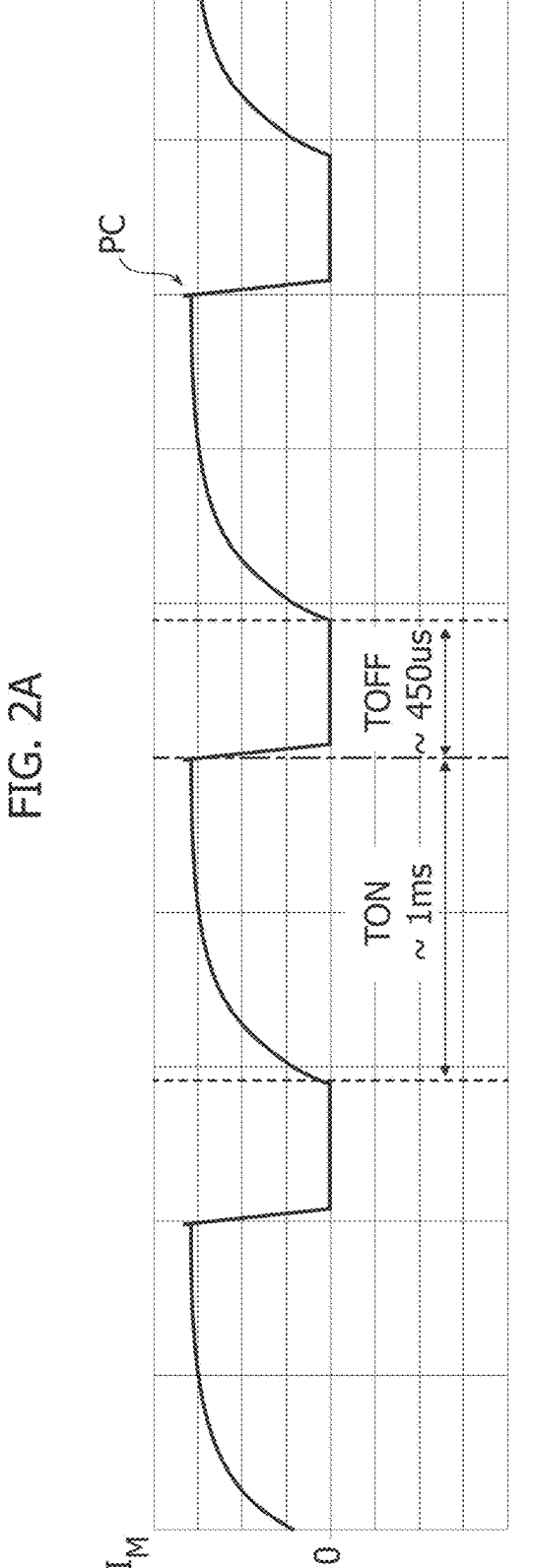
FIG. 2A illustrates a possible time behavior (waveform) of a current in a VCM motor during discontinuous driving.
FIG. 2B illustrates a possible corresponding time behavior (waveform) of a differential voltage across a VCM motor during discontinuous driving.

FIGS. 2A and 2B show, against a common abscissa time scale t, possible time behaviors (waveforms) of:

a current $I_M$ through a VCM motor having a peak value PC (FIG. 2A); and a VCM voltage $VCM_v$ across the same VCM motor in zero VCM speed conditions (FIG. 2B).

FIGS. 2A and 2B both relate to discontinuous driving where the off-times and the on-times have durations TOFF and TON of 450 us and 1 ms respectively.

As noted, these quantitative values are merely exemplary and non-limiting.

The actual VCM voltage $VCM_v$ is in fact out of scale (see the upward pointing arrow OOS) in FIG. 2B, which is primarily intended to illustrate (in a dashed line) a possible time behavior of the residual voltage RV, likewise to a great extent out of scale (see the downward pointing arrow OOS) with reference to a zero-voltage level 0V.

It is otherwise noted that the real BEMF is zero in response to the VCM being stopped during a test.

As already discussed, undesired side effects may arise during discontinuous driving that are related to the presence of a residual voltage RV across the load presented by the VCM motor in response to the current therethrough being abruptly interrupted as is the case during discontinuous driving (this phenomenon is highlighted in FIG. 2B).

As visible in FIG. 2B, the residual voltage RV naturally runs out over time. Its undesired effects can thus be palliated (as conventional in the art) by measuring the BEMF of the VCM motor at the end of the off-time of duration TOFF using relatively long values for the duration TOFF (typically hundreds of microseconds).

Using relatively long values for the duration TOFF negatively affects VCM control in so far as these long values may give rise, for instance, to an increased speed ripple and a limited bandwidth (BW) of the speed control loop.

Moreover, using relatively long values for the duration TOFF produces an intrinsic long latency between the VCM speed variation (for instance due to ramp collision) and the speed control reaction.

Figures 5A, 5B:
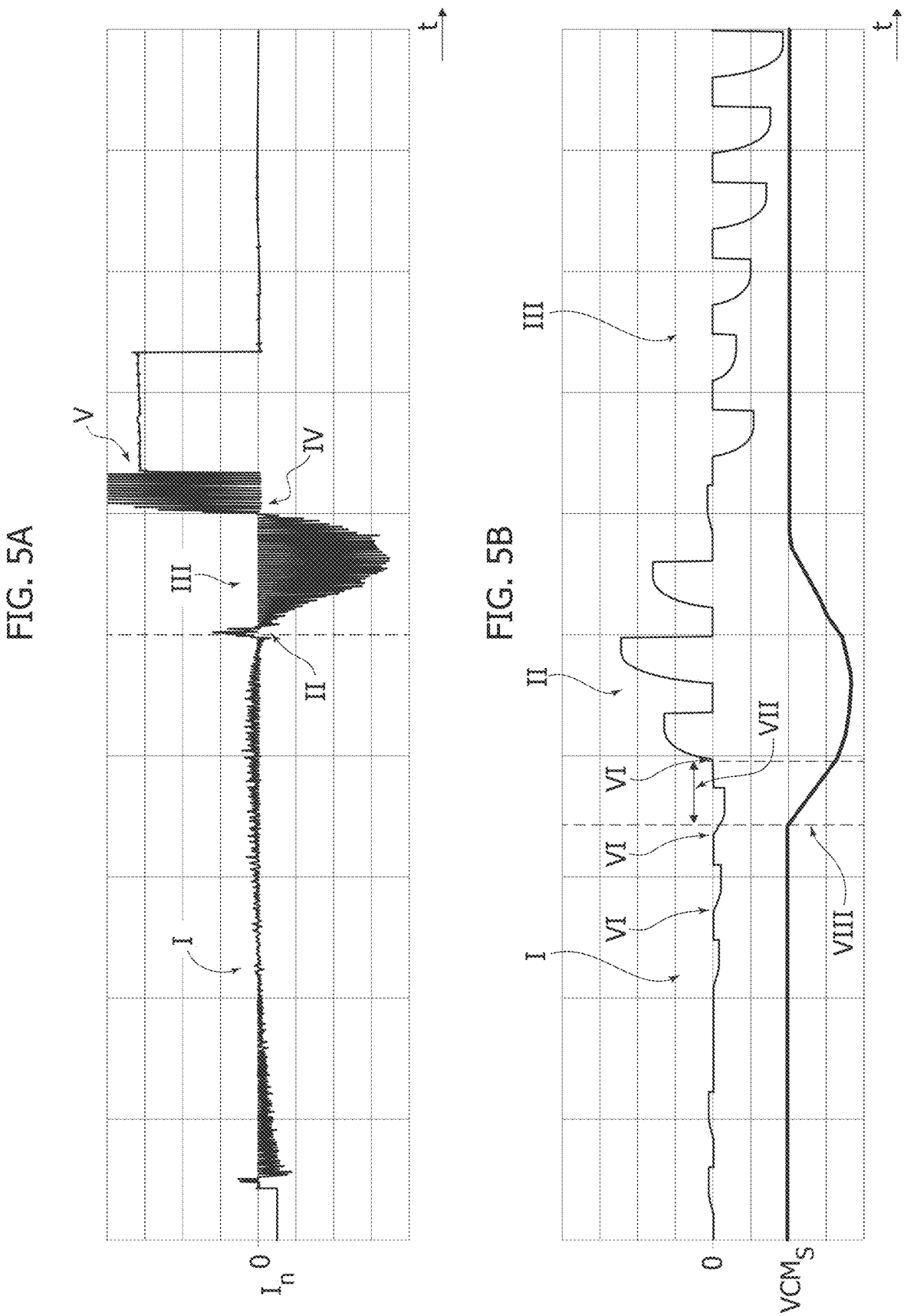
FIG. 5A illustrates a possible time behavior (waveform) of a current in a VCM motor during discontinuous driving in a retract phase, namely during VCM travel from an inner diameter (ID) position to an outer diameter (OD) position.
FIG. 5B is a more detailed (zoomed) view of a portion of FIG. 5A where VCM speed is also represented, with the zoomed zone showing VCM current and speed across the ramp edge.

This is visible in FIG. 5B (to be further discussed later) where the reference VI indicates a speed sampling position at the end of an off-time of duration TOFF and the reference VII indicates the latency between two consecutive speed measures introduced by the low discontinuous driving frequency. FIG. 5B (primarily the references VI and VII) facilitate understanding that a higher discontinuous frequency is desirable in order to counter an undesired drop of the VCM speed during "collision" with the ramp.

In turn, reducing the duration TOFF of the off-times to limit these undesirable effects almost inevitably results in other undesired effects such as an incorrect estimate of the actual speed of the VCM motor, which is distorted by the presence of the residual voltage RV (whose amplitude—as visible in FIG. 2B—may be far from negligible).

Italian patent application No. 102023000012570 (Michele BOSCOLO BERTO, inventor), not yet available to the public at the time of filing of the present application, discloses a possible way of addressing that issue by compensating the residual voltage. That approach facilitates using off-times TOFF having a (very) short duration with some implementation cost.

In fact, for a same duration TOFF of the off-time, the residual voltage (RV in FIG. 2B, for instance) is proportional to the amplitude of the current in the VCM motor during the conduction phases (on-times of duration TON) of discontinuous driving.

The function that relates the current amplitude during the on-times to the residual voltage amplitude during the off-times is non-linear: the solution described in Italian patent application No. 102023000012570 (already cited) involves compensating the residual voltage based on a sort of "linearization" of that relationship.

Figures 3A, 3B:
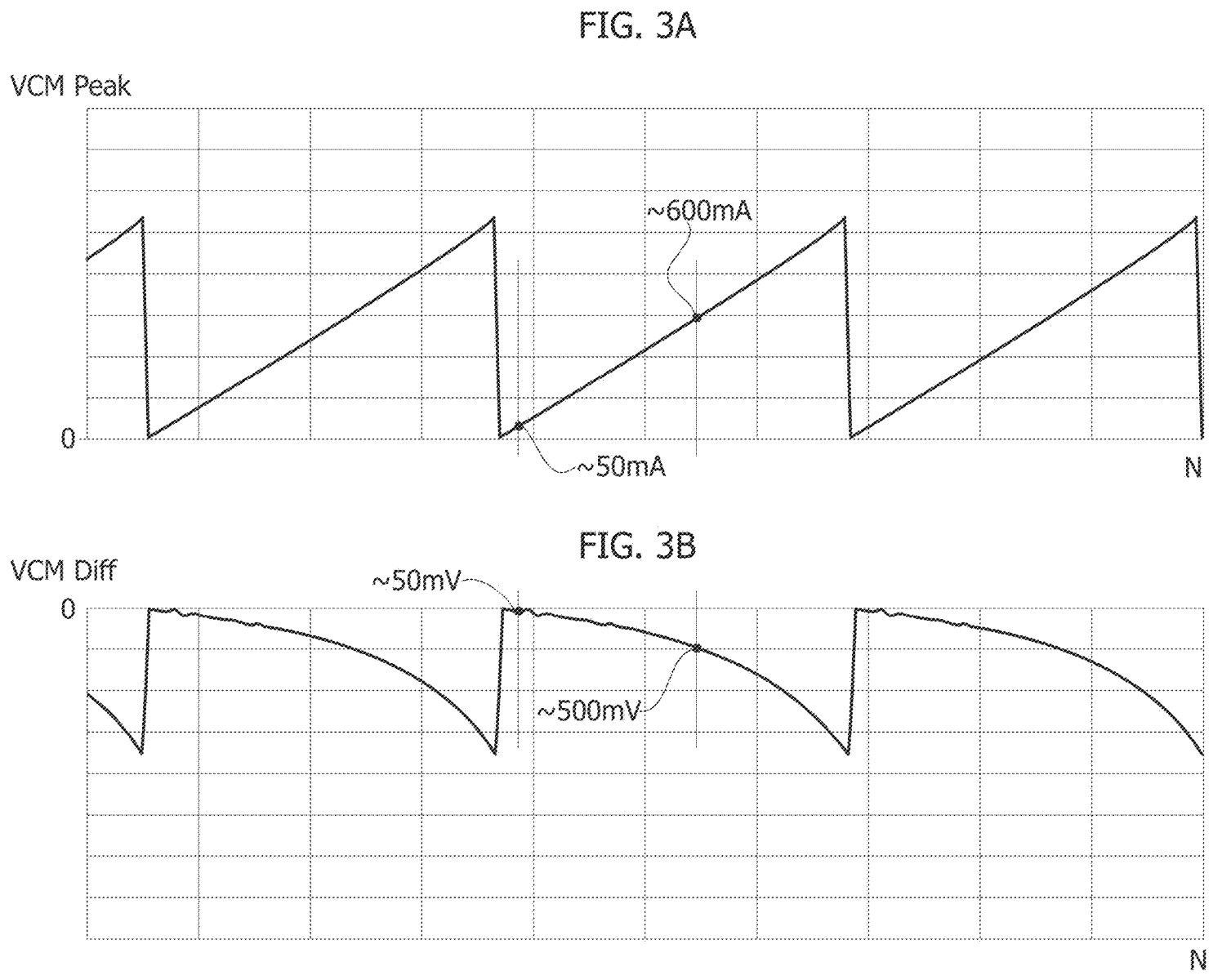

FIGS. 3A and 3B show, against a common abscissa scale (in terms of number N of tests in a sequence) a possible "trend" of the VCM peak current (FIG. 3A) and the VCM differential voltage (FIG. 3B) measured 100 uS after the beginning of TOFF.

It is again noted that the real BEMF is zero in response to the VCM being stopped.

The BEMF generated by the VCM motor during the retract procedure may be, for instance, 200 mV÷300 mV (once again, these quantitative values as well as the values indicated in/derivable from FIGS. 3A and 3B are merely exemplary and non-limiting).

The BEMF generated by the VCM motor during the retract procedure can thus easily go beyond these values at some points during a retract phase, this being especially when the current amplitude is relatively high. This may be the case if a value TOFF is selected for the duration of the off-times the is too short, by otherwise noting that the duration TOFF of the off-times cannot be easily reduced without penalizing the accuracy of the VCM speed measurement.

In the solution described herein, the duration of the off-times TOFF (and thus the frequency of discontinuous driving) is made selectively adaptive, which facilitates addressing the critical issues related to discontinuous retract at a lower cost in comparison with alternative solutions.

In addition to a "BEMF monitor" 100 as described previously, the circuit illustrated in FIG. 1 also includes a retract logic block 160 that is supplied with the (reconstructed) BEMF signal available at the output of the BEMF monitor 100 (ADC converter 140) and supplied with a BEMF reference (speed reference) in the form of a digital value BEMF_REF that is used to compute the speed error and calculate the suitable voltage to control the VCM speed.

FIG. 1 also includes a digital-to-analog converter (DAC) 180 that can be regarded as providing a VCM drive voltage suited to be applied between the nodes VCMP and VCMN through a voltage-controlled power stage 200.

The power stage 200 can be further enabled and disabled through the an enable signal En to implement a discontinuous driving mode. The enable signal En is controlled by the Retract Logic block 160.

As further discussed in the following, the solutions described herein effectively address the issues related to a minimum desired value for the duration TOFF of the off-times and facilitates measuring the BEMF while also tackling with the ensuing limitation of the maximum operating frequency of the speed control loop, which in turn is linked to the residual voltage generated across a VCM motor driven in a discontinuous mode.

Rather than compensating the residual voltage, an approach underlying the solutions described herein is thus to exploit the (very) limited residual voltage amplitude at low driving currents.

Solutions as described herein thus facilitate using short duration values TOFF for the off-times in response to the driving current being relatively low (which facilitates using high frequencies for the speed control loop) while at the same time using long off-times (low frequencies) when the driving current is relatively high.

It is observed that the current profile during a retract phase is well suited to solutions as described herein.

In fact, during the ramp climbing phase, where the read-and-write heads meet and move over the ramp, a high bandwidth (BW) is desirable in order to reduce speed variations due to interaction (collision) of the heads with the ramp. In these conditions, the motor current can be relatively low, which facilitates using high frequencies (thus making it possible to have a large bandwidth BW for the speed control loop and to detect speed variations with a reduced latency).

Conversely, during the final advancement towards the final park position, with end-of-travel (EOT) finally detected, the motor current can be relatively high: this would per se militate against using high frequencies, but in these conditions a large bandwidth is not required and the bandwidth of the speed control loop can be correspondingly limited.

In situations where VCM retract is carried out in a discontinuous mode such as an emergency retract phase, having a duration TOFF of the power interruption time as short as possible is advantageous in so far as this facilitates having high operating frequencies capable of limiting the unwanted effects typical of discontinuous control: speed ripple and limited bandwidth (BW) of the speed control loop.

A limited bandwidth of the speed control loop may represent an issue in the presence of sudden changes in mechanical torques applied externally of the VCM that may occur as the read-and-write heads are advanced from the disk surface towards the EOT position.

For instance, these external torques are nearly zero when the heads advance over the surface of the disk and may undergo a sudden change when the heads meet (hit) the ramp edge.

In response to these sudden variations the speed of the VCM can undergo marked variations. As noted, these variations can be countered by increasing the bandwidth of the speed control loop and reducing the latency between consecutive speed measures. However, this may be limited by the update frequency of the measurement of speed (this practically corresponds to the frequency of discontinuous driving).

Figure 4:
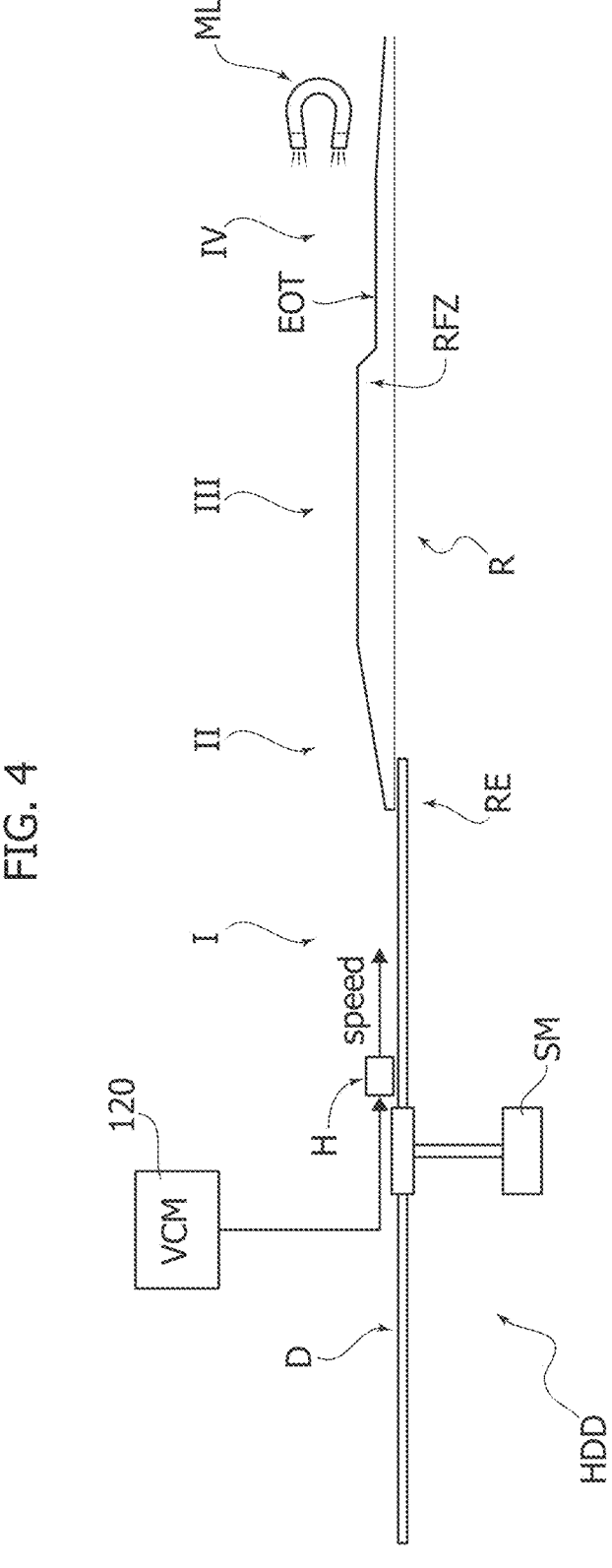
FIG. 4 is a schematic representation of the structure of an HDD showing a travel path of the read-and-write heads during a retract (parking) procedure.

FIG. 4 is a schematic side view of some elements in a hard disk drive HDD, including:

disks D (only one is illustrated for simplicity) where data are stored, a spindle motor SM to rotate (spin) the disk(s), read-and-write heads H to read and write data from and on the surface of the disk(s) D, and a voice coil motor VCM to move the heads H over the surface of the disk(s) D and towards a ramp R (positioned at the outermost part of the disk(s) where the heads H are parked in a parking position.

Such an HDD structure is otherwise conventional in the art and a further detailed description is not provided here for brevity.

The right-hand side of FIG. 4 represents a notional linear development (reproduced not to scale for simplicity and ease of understanding) of a possible profile of a parking ramp R.

In FIG. 4 the travel path of the heads H driven by the VCM motor towards their final park position is illustrated as including four zones identified with Roman numerals I, II, III and IV.

Of these:

Zone I represents the advancement of the heads H over the surface of the disk(s) D towards the ramp R;

Zone II represents the heads H meeting (hitting) the edge RE of the ramp R adjacent the disk surface;

Zone III represents the advancement of the heads H over a flat zone RFZ of the ramp R; and Zone IV represents the heads H reaching an end-of-travel (EOT) condition where they are parked (and possibly retained via a magnetic latch ML to facilitate stable positioning of the heads H in the park position).

Of course, FIG. 4 provides a deliberately simplified representation of the magnetic latch ML with the sole purpose of showing its effect on the VCM: in fact, the magnetic latch ML can be arranged at a different physical location (close to the pivot of the VCM motor, for instance).

FIG. 5A represents a possible time behavior (waveform) of a current through a VCM during a retract procedure carried out in a discontinuous mode where four zones I, II, III, and IV as discussed previously are identified, thus making it possible to identify:

a zone I, where the heads H move over the disk surface, a zone II, where the heads H hit and "climb" over the ramp edge RE, a zone III, where the heads H advance over the flat part of the ramp RFZ; and a zone IV, where the heads H reach the end-of-travel (EOT) point.

In FIG. 5A also an additional zone is shown (indicated by reference V) where the system detects the EOT condition (EOT validation). This can occur in response to detecting a VCM speed which is zero (or, in general, is below a certain threshold) over a number of consecutive discontinuous cycles.

The upper curve in FIG. 5B is a zoomed reproduction (with enlarged abscissa and ordinate scales) of the curve of FIG. 5A detailing signal behavior around a o value in the zones I, II and III with particular attention to the time when the heads H meet (hit) the ramp R.

The lower curve in FIG. 5B shows a possible corresponding time behavior (sharing a same abscissa time scale) of the speed VCM$_s$ of the VCM.

As already discussed, the upper curve in FIG. 5B also shows possible positions of the BEMF (speed) sampling located at the end of an off-time (indicated by the arrows VI) and the latency between two consecutive BEMF sampling events (indicated as VII).

In a worst-case scenario, ramp collision (indicated by the arrow VIII in the lower curve in FIG. 5B) occurs immediately after a speed sampling (arrow VI). In that case the system detects the speed drop with the maximum delay. In this worst-case scenario, the speed drop is maximized and can be limited (only) by using a high discontinuous driving frequency able to reduce the latency between two consecutive speed measures.

AS noted, the lower curve in FIG. 5B is an (approximate) representation of the instantaneous speed VCM$_s$ of the VCM sharing a common enlarged abscissa time scale with the upper curve in the same figure. The lower curve in FIG. 5B thus further details the speed behavior of the heads H (and the VCM) as the heads H "climb" up the ramp R.

Once again, the quantitative values indicated in (or otherwise derivable from) in these figures are merely exemplary and non-limiting.

As one can understand from FIG. 5A, once the EOT point is reached (zone IV), the VCM speed is reset to zero and the speed loop can react by increasing the driving current up to a maximum value. As known to those of skill in the art, a procedure for detecting the end-of-travel condition (EOT detected) may terminate the discontinuous driving after a certain number of discontinuous cycles with the measured speed below a certain threshold (zone V).

FIGS. 5A and 5B again confirm that, during the retract procedure:

a high driving frequency and a high bandwidth of the speed control loop are desirable at the point where the heads meet (hit) the ramp R, and frequency and bandwidth requirements are less demanding in those other areas where the variations in the external torques are less abrupt and exempt from discontinuities.

FIGS. 5A and 5B show that the current in the zone (Zone I) before ramp climbing (Zone II) is fairly small.

In these conditions, the residual voltage RV is correspondingly (quite) low. There, (very) short off-times with short duration TOFF (and thus a high frequency and low latency) can be used, which facilitates a prompt reaction of the speed loop when the heads H meet (hit) the ramp R.

During ramp climbing (Zone II) the current increases in order to counter-act the loss of speed but the current value remains relatively low, which facilitates using off-times having an "intermediate" duration TOFF, which may however be shorter that the (fixed) duration used in those systems where the duration TOFF of the off-times is selected aiming at an accurate detection of the BEMF under all possible conditions, thus taking into account the maximum current imposed at the EOT point.

To summarize, FIG. 4 is exemplary of a method of operating a voice coil motor, VCM 120 in a hard disk drive HDD during a retract phase wherein read-and-write heads H of the hard disk drive are retracted by the VCM 120 from a disk surface D towards an end-of-travel EOT parking condition with the heads H climbing over a ramp R starting from a ramp edge RE adjacent the disk surface D.

During such a retract phase, the VCM 120 is operated in a discontinuous mode comprising an alternation of on-times of duration TON and off-times of duration TOFF wherein supply of a drive current I$_M$ to the VCM 120 is facilitated and countered, respectively.

Such a method of operating a voice coil motor, VCM 120 in a hard disk drive HDD during a retract phase is compatible with those arrangements where the intensity of the drive current I$_M$ through the VCM 120 is controlled (in a manner known per se to those of skill in the art: via a microcontroller MCU in "good" operative conditions or via dedicated HW embedded in the power combo device in emergency conditions) as a function of a Back ElectroMotive Force, BEMF of the VCM.

FIGS. 5A and 5B indicate the possibility of using short off-times (and a high frequency/bandwidth of the speed control loop) in low current conditions (zone I).

More specifically, it is observed that the head travel times across Zone I are essentially identical irrespective of whether off-times or long or short duration TOFF are used so that no error is introduced by a short value for TOFF: a high frequency/bandwidth used in Zone I does not introduce a significant error due to the low-current conditions involved; and in Zone II, travel times may be different because there the current is high (and the residual voltage is correspondingly high): the travel time with a long off-time (this can be taken as a reference) is shorter than in the case of a short off-time and the residual voltage introduces an error on the controlled speed.

Consequently, a short value for the duration TOFF is generally unsuited to be used as a fixed value: however, it can be used when the current is small.

It is otherwise noted that the ramp edge RE is right at the end of a low current zone (head travel over the disk surface) so that a high frequency (a large bandwidth of the speed control loop) can be advantageously used when the VCM motor is travelling in Zone I and approaching the ramp R.

Solutions as described herein facilitate reducing speed variation at the most critical point (essentially Zone II in FIGS. 5A and 5B) in comparison with those systems that for the duration TOFF of the off-time use a single (fixed) value that is almost inevitably selected as a long duration in order not to compromise BEMF measurement, which in turn results in a relatively low constant frequency for discontinuous mode operation.

Figure 6:
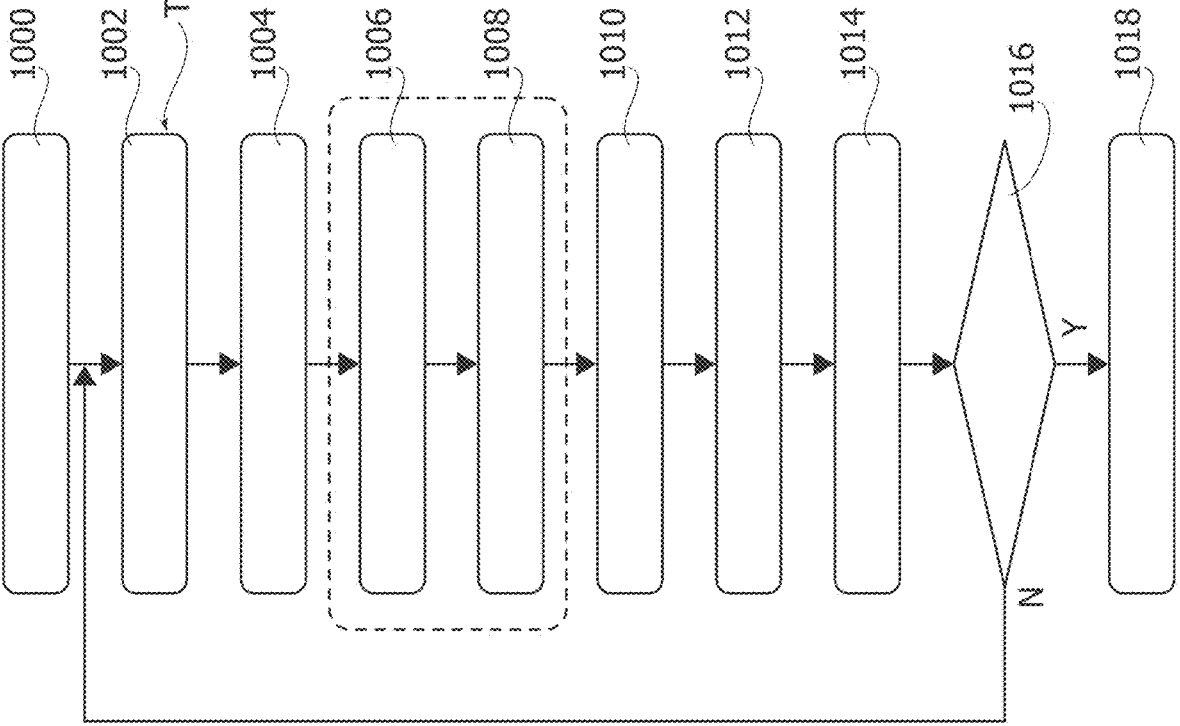
FIG. 6 is flow-chart illustrative of a possible sequence of steps in a method as described herein.

FIG. 6 is a flow chart exemplary of steps in a procedure that implements a solution as described herein.

For instance, that procedure can be implemented in a servo controller MCU as illustrated in FIG. 1 during the normal operative conditions (when MCU is alive and properly working) or implemented in dedicated hardware embedded into the power combo for those cases where the MCU is not operative as, for example, during emergency conditions.

In any case, the procedure can be configured (in a manner known per se to those of skill in the art) to adjust the VCM drive current as desired in order to perform "VCM load" and "VCM unload"/"VCM retract" procedures.

This may occur via a DAC control word provided by the controller MCU or via a DAC control word provided by the retract logic block 160 based on a BEMF voltage generated by the VCM motor during movement in so far as the BEMF is (directly) proportional to the speed of the VCM.

In solutions as described herein, a BEMF reconstruction circuit 100 as illustrated in FIG. 1 is advantageously supplemented with the retract logic block 160 that is supplied with the (reconstructed) BEMF signal available at the output of the circuitry 100 (ADC converter 140) plus a digital-to-analog converter (DAC) 180 that can be regarded as providing a VCM voltage suited to be applied between the nodes VCMP and VCMN through the voltage-controlled power stage 200.

The flow chart of FIG. 6 is exemplary of a procedure applicable in driving a VCM motor in a hard disk drive (HDD) in a discontinuous mode during a retract phase wherein the VCM motor is energized with a current flowing therethrough during on-times (of duration TON) that alternate with off-times (of duration TOFF) where the VCM motor is not energized with current flow therethrough interrupted.

In solutions as described herein, the duration of those times is not fixed: for instance, the duration of the current interruption times (TOFF) can be modulated in manner such as to be a function of the amplitude (intensity) of the current used to drive the motor that is estimated by reading the DAC (180) input value that is generated by the speed control loop embedded into the retract logic block (160).

Possible (generally mutually non-exclusive) options to achieve that result may include, for instance:

the duration TOFF can be selected out of two or more values, the duration TOFF can vary between a minimum value and a maximum saturation value, the duration TON of the energization (excitation) times (TON) can be determined as a function of the duration of current interruption times, namely TOFF; for instance, TON can be selected equal to K1*TOFF where K1 is a value stored into a programmable register. K1 values can be, for example 1.5 or 2, the duration TOFF can vary between a minimum (lower bound) value and a maximum (upper bound) saturation value.

One example of dynamic TOFF duration that is function of the VCM current (estimated through the DAC input value) is:

$$TOFF = \mathrm{Min}TOFF * (1 + K2 * [DAC])$$

where MinTOFF a minimum (lower bound) value for TOFF and K2 is a stepwise adjustable increase factor of the duration TOFF of the off-times.

For instance, K2 can be made programmable to render K2*[DAC] variable as a function of a two-bit input word Ktoff [1:0] according to the following truth table.

| Ktoff[1:0] | K2 | TOFF |
|---|---|---|
| 00 | 0 | MinTOFF |
| 01 | 1 | TOFF = MinTOFF*(1 + K2*[DAC]) |
| 10 | 2 | |
| 11 | 4 | |

A duration TON can be correspondingly determined as $$TON = 2 * TOFF$$

(that is, a 66% duty cycle).

Absolute values or ranges of values for TOFF and TON may depend on various factors/parameters related to the intended application (a desired target speed for retract may be exemplary of one such factor/parameter).

By way of non-limiting examples, possible ranges of variation for TOFF may be 200 to 600 us (max TOFF at saturation) while possible ranges of variation for TON may be 400 to 1200 us (max TON at saturation).

Values of TOFF near or at the upper bound can be selected with a view to the intended application such as to facilitate an adequate measurement of the BEMF.

The blocks in the flow-chart of FIG. 6 are indicative of the following steps or actions:

block 1000—retract started (VCM speed is initialized)

block 1002—target speed value T set and speed error is calculated block 1004—DAC 180 activated based on Speed error block 1006—computation of duration TOFF (taking into account a possible saturation value)

block 1008—computation of duration TON (taking into account a possible saturation value)

block 1010—disc current pulse forced block 1012—VCM speed sampled block 1014—possible end-of-travel (EOT) validation block 1016—check as to whether EOT is reached; in response to a negative outcome (N) of block 1016, the system loops back to block 1002 with a (new) VCM speed value T and new error is calculated block 1018—in response to a positive outcome (Y) of block 1016 the retract procedure is terminated.

To summarize:

any time the speed is read, a new DAC value is calculated based on the measured speed error;

the DAC value is translated into a driving voltage (and thus a VCM current);

any time a new DAC value is written (a new current is forced) updated values are calculated for the duration TON and TOFF of the on-times and off-times.

The procedure outlined above lends itself to being implemented in a controller unit (MCU in FIG. 1) of the HDD, provided such a controller is "alive", which may not be the case for an emergency retract phase.

Advantageously, the procedure can be implemented via hardware circuitry integrated in the HDD power combo.

A procedure as illustrated in the flow-chart of FIG. 6 facilitates using smaller values for TOFF (short off-times) and thus a higher speed loop bandwidth BW during the critical point of the retract, where the VCM starts climbing the ramp (Zone II in FIGS. 5A and 5B).

A higher frequency can thus be used when the drive current is small that, which is the conditions when the VCM motor is approaching the ramp edge RE. A higher frequency means a larger BW of the speed control loop and reduced speed sampling latency, which a reduced speed drop during ramp climbing.

A procedure as illustrated in the flow-chart of FIG. 6 facilitates a VCM discontinuous retract with variable frequency, wherein the frequency is modulated as a function of the drive current.

A high frequency—with short off-times—can be used when the current is low, and vice versa a lower frequency—with longer off-times—can be used when the current is higher.

When discontinuous retract is working at high frequency the speed control bandwidth BW can be increased, which facilitates a better speed control when the heads meet (hit) the ramp edge, with ramp climbing started.

Solutions as described herein thus provide an effective alternative to other solutions such as discontinuous mode operation where residual voltage is compensated or continuous mode operation using a BEMF monitor circuit that requires calibration just before being used.

Without prejudice to the underlying principles, the details and embodiments may vary, even significantly, with respect to what has been described by way of example only, without departing from the extent of protection.

The extent of protection is determined by the annexed claims.

What is claimed is:

1. A method, comprising:

operating a voice coil motor (VCM) in a hard disk drive during a retract phase in which read-and-write heads of the hard disk drive are retracted by the VCM from a disk surface towards an end-of-travel parking condition with the heads climbing over a ramp starting from a ramp edge adjacent the disk surface;

during the retract phase, operating the VCM in a discontinuous mode comprising an alternation of on-times of a duration TON and off-times of a duration TOFF in which supply of a drive current to the VCM is facilitated and countered, respectively; and during the retract phase, varying the duration TOFF of the off-times, with the duration TOFF of the off-times increasing from a first lower bound value at the ramp edge towards a first upper bound value as the heads climb over the ramp.

2. The method of claim 1, wherein the duration TOFF of the off-times varies linearly from the first lower bound value towards the first upper bound value.

3. The method of claim 1, wherein the first lower bound value and the first upper bound value of the duration TOFF of the off-times are about 200 us and about 600 us, respectively.

4. The method of claim 1, further comprising varying the duration TON of the on-times with the duration TON of the on-times increasing from a second lower bound value at the ramp edge towards a second upper bound value as the heads climb over the ramp.

5. The method of claim 4, further comprising varying the duration TON of the on-times as a function of the duration TOFF of the off-times.

6. The method of claim 5, further comprising varying the duration TON of the on-times according to:

$$TON = K1 * TOFF$$

where:

K1 is a proportionality factor equal to 1.5 or 2.

7. The method of claim 4, wherein the second lower bound value and the second upper bound value of the duration TON of the on-times are about 400 us and about 1200 us, respectively.

8. The method of claim 1, further comprising controlling an intensity of the drive current through the VCM as a function of a back electromotive force of the VCM.

9. A control circuit comprising:

retract logic circuitry configured to be coupled to a voice coil motor (VCM) in a hard disk drive, and configured to, during a retract phase:

operate the VCM to retract read-and-write heads of the hard disk drive from a disk surface towards an end-of-travel parking condition with the heads climbing over a ramp starting from a ramp edge adjacent the disk surface;

operate the VCM in a discontinuous mode comprising an alternation of on-times of a duration TON and off-times of a duration TOFF in which supply of a drive current to the VCM is facilitated and countered, respectively; and vary the duration TOFF of the off-times, with the duration TOFF of the off-times increasing from a first lower bound value at the ramp edge towards a first upper bound value as the heads climb over the ramp.

10. The control circuit of claim 9, wherein the retract logic circuitry is configured to linearly vary the duration TOFF of the off-times from the first lower bound value towards the first upper bound value.

11. The control circuit of claim 9, wherein the first lower bound value and the first upper bound value of the duration TOFF of the off-times are about 200 us and about 600 us, respectively.

12. The control circuit of claim 9, wherein the retract logic circuitry is configured to vary the duration TON of the on-times with the duration TON of the on-times increasing from a second lower bound value at the ramp edge towards a second upper bound value as the heads climb over the ramp.

13. The control circuit of claim 12, wherein the retract logic circuitry is configured to vary the duration TON of the on-times as a function of the duration TOFF of the off-times.

14. The control circuit of claim 13, wherein the retract logic circuitry is configured to vary the duration TON of the on-times according to:

$$TON = K1 * TOFF$$

where:

K1 is a proportionality factor equal to 1.5 or 2.

15. The control circuit of claim 12, wherein the second lower bound value and the second upper bound value of the duration TON of the on-times are about 400 us and about 1200 us, respectively.

16. The control circuit of claim 9, wherein the retract logic circuitry is configured to control an intensity of the drive current through the VCM as a function of a back electromotive force of the VCM.

17. A hard disk drive, comprising:

at least one voice coil motor (VCM); and a control circuit comprising retract logic circuitry coupled to the VCM and configured to, during a retract phase:

operate the VCM to retract read-and-write heads of the hard disk drive from a disk surface towards an end-of-travel parking condition with the heads climbing over a ramp starting from a ramp edge adjacent the disk surface;

operate the VCM in a discontinuous mode comprising an alternation of on-times of a duration TON and off-times of a duration TOFF in which supply of a drive current to the VCM is facilitated and countered, respectively; and vary the duration TOFF of the off-times, with the duration TOFF of the off-times increasing from a first lower bound value at the ramp edge towards a first upper bound value as the heads climb over the ramp.

18. The hard disk drive of claim 17, wherein the hard disk drive is disposed in a processing device.

19. The hard disk drive of claim 17, wherein the retract logic circuitry is configured to vary the duration TON of the on-times with the duration TON of the on-times increasing from a second lower bound value at the ramp edge towards a second upper bound value as the heads climb over the ramp.

20. The hard disk drive of claim 17, wherein the retract logic circuitry is configured to control an intensity of the drive current through the VCM as a function of a back electromotive force of the VCM.

* * * * *